June 17, 1947. E. H. PIRON 2,422,366
RESILIENT METAL WHEEL
Filed Sept. 29, 1942 2 Sheets-Sheet 1
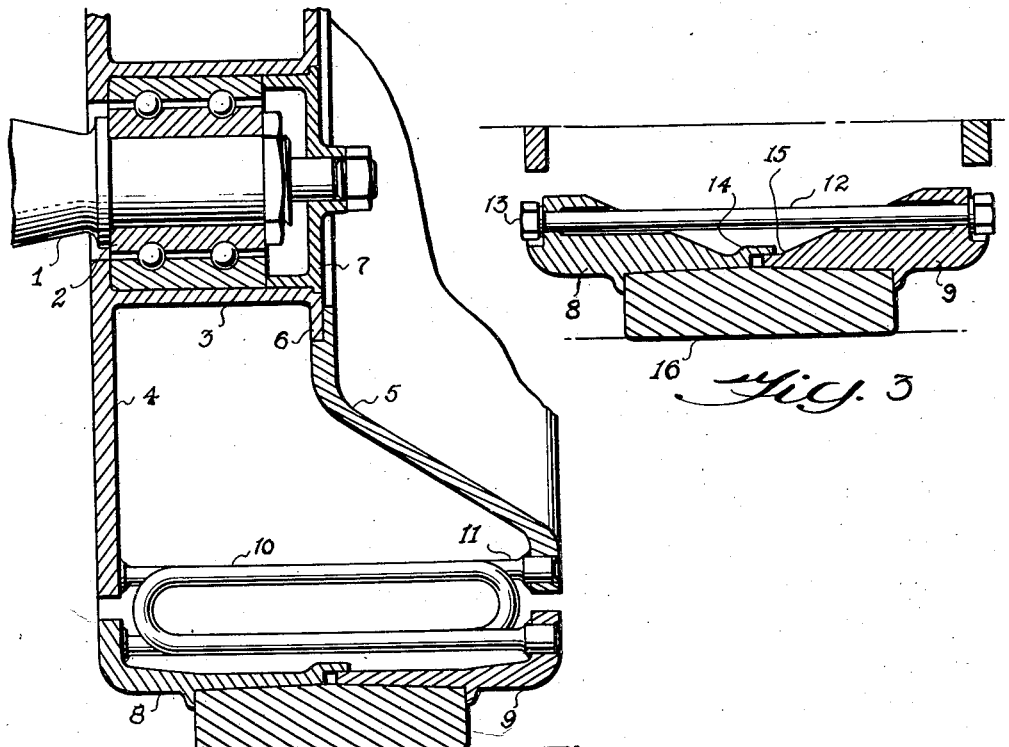
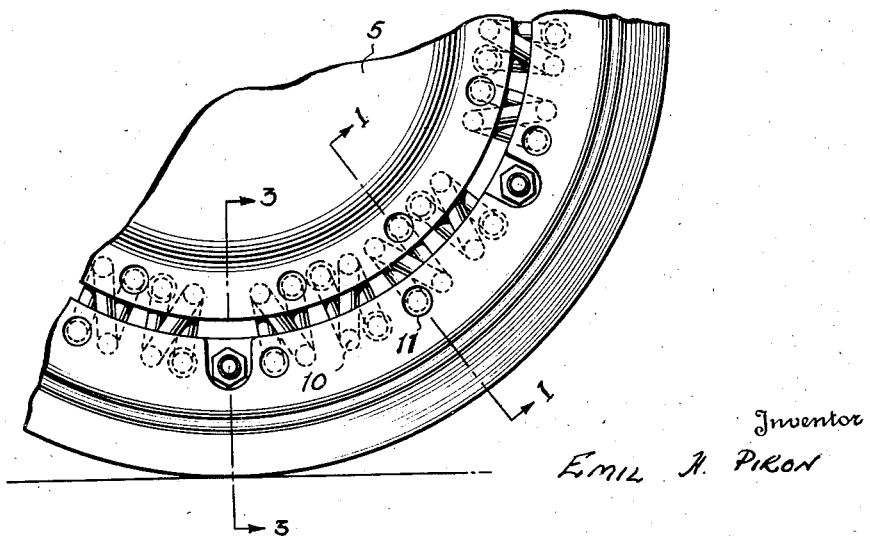
Inventor
Emil H. Piron
By (signature)
Attorney June 17, 1947.   E. H. PIRON   2,422,366
RESILIENT METAL WHEEL
Filed Sept. 29, 1942   2 Sheets-Sheet 2

Inventor
Emil H. Piron
By J. Windsor Davis
Attorney

Patented June 17, 1947

2,422,366

UNITED STATES PATENT OFFICE 2,422,366

RESILIENT METAL WHEEL

Emil H. Piron, New York, N. Y., assignor to Transit Research Corporation, New York, N. Y., a corporation of New York Application September 29, 1942, Serial No. 460,071

4 Claims. (Cl. 152—87)

This invention relates to resilient wheels for vehicles and has for its object to provide a wheel capable of useful service at moderate speed and made with a minimum amount of rubber. In fact no rubber at all is required but a small amount of rubber is desirable as will be explained.

Another object is to provide a wheel having metallic springs separating the hub and tread surface, the springs being positioned parallel to the axis of the wheel and hence transverse to its intended direction of rotation.

This application reveals a wheel generally similar to that shown in my co-pending application Serial Number 449,452 filed July 2, 1942, and differs therefrom, among other things, in that it shows the adaptation of transverse springs to a wheel having a wide tread surface. Thus for instance, dual rear wheels, such as are used on buses, may be replaced by a single pair of wheels of this design each wheel having a very wide tread surface with the springs supporting the tread surface from opposite sides. If the present wheel is to be used for a lighter vehicle such as a passenger car or taxicab a tread surface of substantial width is used and the springs may be extended throughout the full width of the wheel.

Another object is to provide a wheel of substantial load carrying capacity which will have the transverse springs housed therein and which will, therefore, resemble a conventional wheel except for the tread surface.

Another and principal object of the invention is to transfer the resiliency of the wheel from the tread surface, conventionally a pneumatic tire, to the region between the rim and the hub and to substitute for the pneumatic tire a solid tire which may be made of any one of a number of materials such, for instance, as fabric impregnated with rubber or any plastic having flexing qualities, or a solid rubber tire, or a more rigid material such as wood or metal. Obviously a tread surface material having some degree of flexibility is preferable since it will be quieter in operation.

A further object is to provide a two part wheel rim split transversely with each part forming a portion of a groove so that when the parts are held in pressure assembly the tread surface will be tightly clamped therebetween.

Figure 4:
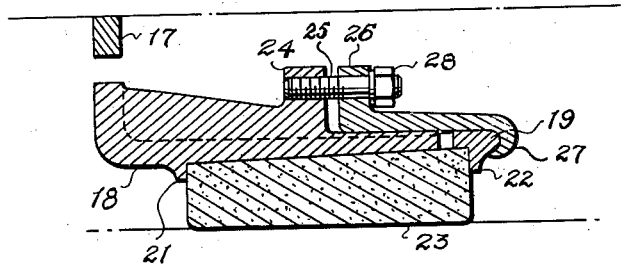
Figure 5:
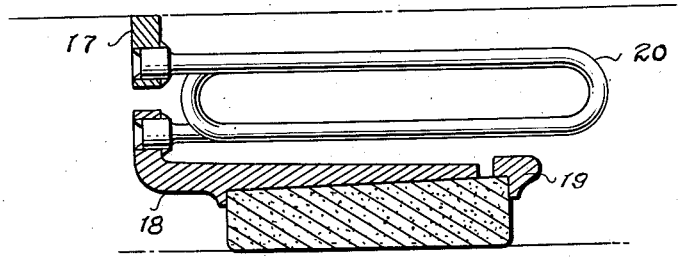
Figure 6:
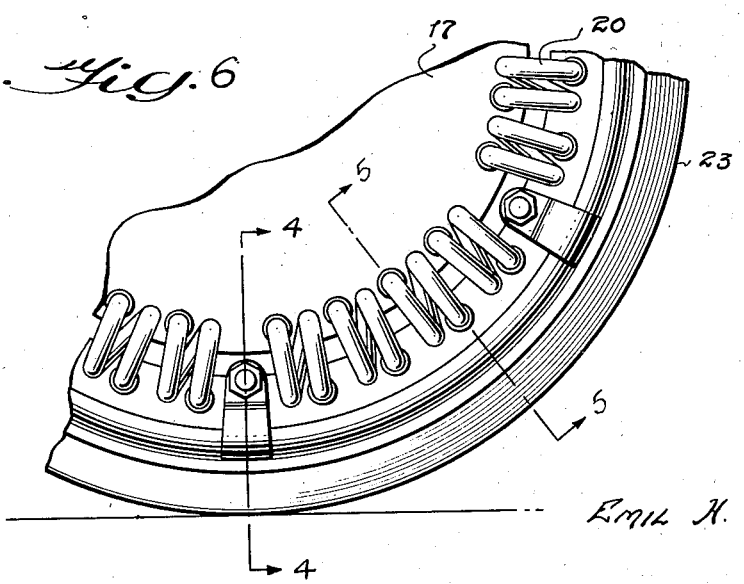

Other objects and advantages will become more fully apparent as reference is had to the accompanying drawings in which my invention is illustrated in two adaptations and in which Figure 1 is an axial diametric section of the lower half of my improved wheel and including the axle, the view being taken along the line 1—1 of Figure 2, Figure 2 is a partial side elevation of the right side of the wheel of Figure 1, Figure 3 is a transverse section taken along the line 3—3 of Figure 2, Figures 4, 5 and 6 illustrate the inventive portions of a modification of the wheel of Figures 1, 2 and 3, Figure 4 being a transverse section taken at the line 4—4 of Figure 6, Figure 5 is a transverse section taken at the line 5—5 of Figure 6 and Figure 6 is a side elevation of a section of a wheel looking to the left in Figures 4 and 5.

More particularly, 1 indicates the axle of a vehicle having a bearing 2 therearound to accept a wheel. Neither the axle nor the bearing forms any part of my invention and hence it may be varied at will depending upon the type and size vehicle.

Mounted on the bearing 2 is my improved wheel composed of a hub 3 having an integral main plate 4 radiating therefrom at one end and a second main plate 5 radiating therefrom at the other end. The plate 5 abuts a flange 6 of the hub 3 and may be bolted or otherwise secured thereto. A hub sleeve 7 with a suitable nut retains the wheel in position on the bearing 2.

The plate 4 is substantially planar while the plate 5 flares outwardly. Spaced from the periphery of these plates are two portions 8 and 9 of the wheel rim. Connecting the main plates 4 and 5 with the rim portions 8 and 9 are two series of springs 10 and 11, the springs of the series 10 each being anchored at one end to the plate 4 near the outer periphery thereof and at its other end to the rim portion 8 near the inner periphery thereof. The springs of the series 11 are each anchored at one end to the plate 5 near the outer periphery thereof and at its other end to the rim member 9 near the inner end thereof. The springs of the series 10 alternate with those of the series 11.

The springs, above mentioned, are all substantially identical in design, each one being in the form of U with a loop therein. The springs may be described as coil springs with the coils being substantially radial of the wheel hub. Each spring is preferably round in cross-section.

The two rim portions are urged together by a bolt 12 having a nut 13 thereon, the flange 14 receiving the tongue 15 to aid in holding the parts in proper assembly. As the nut 13 is tightened on the bolt 12 pressure is imposed on the tire 16.

The tire 16 may be made of any suitable material. It is preferably made of solid rubber or a rubber or plastic impregnated fabric, but may be made of wood or metal.

The wheel of Figures 4, 5 and 6 comprises a single main plate for securement to the wheel hub (not shown) and two rim portions 18 and 19. A series of springs 20 connects the plate 17 to the rim member 18, each spring 20 being anchored at one end near the outer periphery of the plate 17 while the other end thereof is anchored to the member 18 near the inner periphery thereof. Each spring 20 is made and shaped similarly to the springs of the series 10 and 11 of Figures 1 and 3.

Each of the two members 18 and 19 has a flange 21 and 22 respectively for retaining a tread surface 23 therebetween. The member 18 has a plurality of perforated flanges or lugs 24 for reception of a screw bolt 25. Mating retainers 26 are each provided with a perforated lug at one end to receive a screw bolt 25 and with a hooked or curved other end 27 for engagement with the member 19. When the nuts 28 are tightened pressure is imposed on the tread surface 23. This tread surface may be made of any of the materials described in connection with the tread surface 16.

Various modifications and changes will suggest themselves to those skilled in the art and I desire to be extended protection within the scope of the appended claims.

What I claim is:

1. A wheel comprising a hub having at least one main plate radiating therefrom, a rim having a tread surface carried thereby and coil springs separating said main plate and said rim, the coils of each of said springs being elongated in a direction normal to the plane of travel of the wheel and terminating in parallel ends, said ends being anchored in openings in said main plate and rim respectively, the axes of said ends being normal to the intended direction of travel of said wheel, each of said coils having a length at least as great as the width of said rim and having its elongated portions parallel substantially throughout their entire length.

2. A wheel comprising a hub having at least one main plate radiating therefrom, a rim having a tread surface carried thereby, said rim having at least one flange extending radially inwardly therefrom, said flange being radially spaced from the periphery of said plate, a series of coil springs the coils of each of which is elongated in a direction normal to the plane of the wheel, each of said springs having one end extending laterally into said plate inwardly of its periphery and its other end extending laterally into said flange radially outwardly of its inner periphery, said plate and said rim being adapted to contact each other at their outer and inner peripheries respectively under undue loading thereby protecting the coils of said springs against being crushed.

3. A wheel comprising a hub having two main plates radiating therefrom, a rim having a tread surface carried thereby, said rim having its edges inturned toward said hub and terminating opposite the outer peripheries of said plates, a series of coil springs the coils of each of which is elongated in a direction normal to the plane of the wheel, said springs separating said edges from said outer peripheries during normal loading, said edges and said outer peripheries being adapted to contact under unduly heavy loading thereby protecting said springs against being crushed.

4. A wheel comprising a hub having two main plates radiating therefrom, a rim having a tread surface carried thereby, said rim having its edges inturned toward said hub and terminating opposite the outer peripheries of said plates, said plates together with the rim forming a compartment, coil springs in said compartment, the coils of said springs residing substantially normal to the plane of the wheel and being housed partially between said plates and partially between said upturned edges, the ends of each of said springs being parallel and inserted laterally into one of said plates and into one of said upturned edges, said edges and said outer peripheries being adapted to contact under abnormal loading thereby limiting the possible deflection of said springs.

EMIL H. PIRON.

REFERENCES CITED

The following references are of record in the file of this patent:

UNITED STATES PATENTS

| Number | Name | Date |
|---|---|---|
| 1,350,370 | Leviston et al. | Aug. 24, 1920 |
| 1,536,225 | Lea | May 5, 1925 |
| 1,381,105 | Bullock | June 14, 1921 |
| 1,031,763 | Woodland | July 9, 1912 |
| 1,077,407 | Hollenbeck | Nov. 4, 1913 |
| 1,037,004 | Hill | Aug. 27, 1912 |
| 892,075 | O'Brien | June 30, 1908 |